United States Patent
Tanaka et al.

(10) Patent No.: US 7,093,489 B2
(45) Date of Patent: Aug. 22, 2006

(54) ACCELERATION SENSOR

(75) Inventors: Hiroshi Tanaka, Yokohama (JP); Masanori Yachi, Yokohama (JP)

(73) Assignee: Fujitsu Media Devices Limited, Yokohama (JP)

( * ) Notice: Subject to any disclaimer, the term of this patent is extended or adjusted under 35 U.S.C. 154(b) by 0 days.

(21) Appl. No.: 11/056,404

(22) Filed: Feb. 14, 2005

(65) Prior Publication Data

US 2005/0172716 A1 Aug. 11, 2005

Related U.S. Application Data

(63) Continuation of application No. PCT/JP03/10348, filed on Aug. 14, 2003.

(30) Foreign Application Priority Data

Aug. 15, 2002 (JP) .............................. 2002-237061

(51) Int. Cl.
*G01P 15/09* (2006.01)

(52) U.S. Cl. ............................. 73/514.32; 73/514.34; 310/329; 310/366

(58) Field of Classification Search ........... 373/514.32, 373/514.34, 514.29; 361/280
See application file for complete search history.

(56) References Cited

U.S. PATENT DOCUMENTS

| | | | | |
|---|---|---|---|---|
| 5,095,751 A | * | 3/1992 | Wada et al. | 73/514.16 |
| 5,824,904 A | * | 10/1998 | Kouhei et al. | 73/514.34 |
| 6,209,393 B1 | * | 4/2001 | Tomikawa et al. | 73/504.12 |
| 6,823,735 B1 | * | 11/2004 | Ishikawa et al. | 73/514.02 |

FOREIGN PATENT DOCUMENTS

| | | | | |
|---|---|---|---|---|
| JP | 63107215 A | * | 5/1988 | |
| JP | 7-16168 | | 3/1995 | |
| JP | 8-136573 | | 5/1996 | |
| WO | WO 2004/017075 A1 | | 2/2004 | |

* cited by examiner

*Primary Examiner*—Hezron Williams
*Assistant Examiner*—Tamiko Bellamy
(74) *Attorney, Agent, or Firm*—Arent Fox PLLC

(57) ABSTRACT

A piezoelectric vibrator 2 that generates an electric charge according to a stress and a weight 1 provided on the piezoelectric vibrator 2 are included. The piezoelectric vibrator 2 has multiple pairs of sensing electrodes 3a and 3b, and 4a and 4b, and the sensing electrodes 3a and 3b, and 4a and 4b are respectively connected in parallel so that capacitances Cd1 and Cd2 made of the sensing electrodes may be connected in parallel. It is thus possible to double the charge sensitivity with keeping the voltage sensitivity.

15 Claims, 8 Drawing Sheets

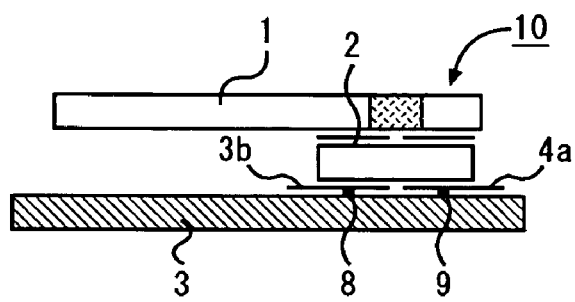
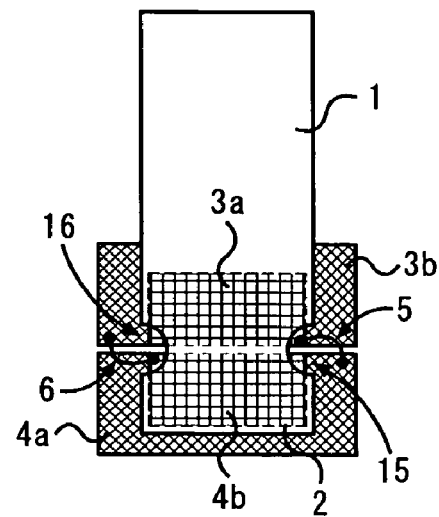
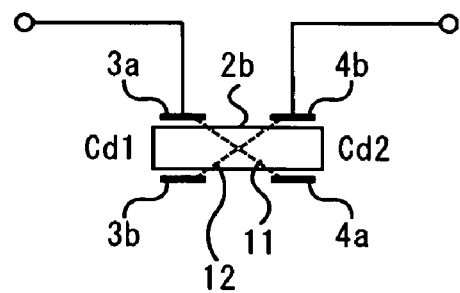

ACCELERATION SENSOR

CROSS-REFERENCE TO RELATED APPLICATION

This nonprovisional application is a continuation application of and claims the benefit of International Application Number PCT/JP03/10348, filed Aug. 14, 2003. The disclosure of the prior application is hereby incorporated herein in its entirety by reference.

BACKGROUND OF THE INVENTION

1. Field of the Invention

This invention generally relates to a piezoelectric acceleration sensor used for detecting a shock and acceleration applied to an object, and more particularly, to an acceleration sensor for detecting a characteristic amount generated by an inertial force, which is caused resulting from acceleration.

2. Description of the Related Art

In recent years, memory density of a hard disk drive (hereinafter simply referred to as HDD) has been becoming higher at a rapid pace. For this high memory density, a precise control of head positioning is one of the important factors in performing read/write.

For instance, in the case where a chassis of HDD also makes a rotational vibration when affected by another electronics device such as a DVD, CD-ROM, or the like mounted on a personal computer (hereinafter simply referred to as PC), the rotational vibration should be detected and stopped to keep controlling the head positioning.

The acceleration sensor is generally used for the detection of the rotational vibration. Specifically, two acceleration sensors are used for detecting the rotational vibration according to differences in outputs thereof.

Also, portable electronics devices, which have widely been used in recent years, are required to detect and stop the shock in order to maintain the reliability even in the case where an unexpected shock is applied thereto. The above-mentioned acceleration sensor is widely employed in the portable electronics devices such as a notebook-size PC, desktop PC, or the like, in order to prevent an error in the read-in/read-out in the case where an unexpected shock is applied to a HDD which is incorporated into the above-mentioned portable electronics device.

With the advancements of the electronics devices into which the acceleration sensors are incorporated, it is necessary to lower the noises of these electronics devices. An amplifier for amplifying the electrical charge has been proposed to lower the noises. The amplifier for amplifying the electrical charge is capable of lowering line noises and is provided on a signal amplification circuit. Therefore, a high sensitivity to electrical charge is required for the acceleration sensor to improve matching capabilities with an electrical charge amplification circuit.

FIG. 1 shows a conventional piezoelectric acceleration sensor 100. Referring to FIG. 1A, the acceleration sensor 100 includes a piezoelectric vibrator 102 and a circuit board 103. The piezoelectric vibrator 102 is provided on the circuit board 103. A weight 101 is provided on the piezoelectric vibrator 102. The piezoelectric vibrator 102 is polarized in Z direction in FIG. 1A. The weight 101 has a center of gravity outside the piezoelectric vibrator 102.

The piezoelectric vibrator 102, referring to FIG. 1B, includes a capacitance Cd1 composed of electrodes 103a and 103b. FIG. 1C shows an equivalent circuit of the piezoelectric vibrator 102 shown in FIG. 1B. With this configuration, when a vibration or shock is applied to the acceleration sensor 100 (in particular, the weight 101), an electric charge generates on the piezoelectric vibrator 102 (a generated electric charge Q1)

Thus, in a conventional technique 1, the generated electric charge Q1 on the piezoelectric vibrator 102 of the acceleration sensor 100 is detected as a voltage value or charge value, based on a voltage sensitivity SV (See an expression 1) dependent on the capacitance Cd1 or a charge. sensitivity SQ (See an expression 2). It is thus detected that the vibration or shock has been applied.

$$SV = Q1/Cd1 \quad \text{(expression 1)}$$

$$SQ = SV * Cd1 \quad \text{(expression 2)}$$

As an improved technique of the charge sensitivity of an acceleration sensor, Japanese Patent Application Publication No. 2000-121661 discloses a charge-sensitive acceleration sensor 200. FIG. 2 shows the acceleration sensor 200 as a conventional technique 2.

Referring to FIG. 2A, the acceleration sensor 200 includes a piezoelectric vibrator 202 having a double layer structure. FIG. 2B shows an equivalent circuit of the piezoelectric vibrator 202. With this configuration, sensing electrodes of a piezoelectric material are connected in parallel to adjust the polarized directions. The capacitance becomes larger and thus improves the detection sensitivity to the charge.

However, with the acceleration sensor that employs the layered piezoelectric material as described in the conventional technique 2, it is required that the piezoelectric materials are multilayered, polarized axis of each piezoelectric material is adjusted, and the sensing electrodes are intricately connected. This results in problems, complicated configuration and complex manufacturing. These problems lead to another problem in cost reduction. In addition, with the configuration of the conventional technique 2, the voltage sensitivity is lowered. This causes further another problem in that a detection signal is hard to be separated from the noises.

The present invention has been made in view of the above-mentioned circumstances and provides an acceleration sensor with a simple configuration, while maintaining the voltage sensitivity and improving the charge sensitivity.

SUMMARY OF THE INVENTION

In order to solve the above-mentioned problems, the present invention includes, as claimed in claim 1, an acceleration sensor characterized by including a vibrator that generates an electric charge according to a stress, and a weight provided on the vibrator, the vibrator has multiple pairs of sensing electrodes on front and back surfaces, and capacitances formed with the sensing electrodes are connected in parallel. This makes it possible to connect the capacitances in parallel without a complicated structure. It is possible to realize the acceleration sensor having the improved charge sensitivity while maintaining the voltage sensitivity.

BRIEF DESCRIPTION OF THE DRAWINGS

FIG. 1A is a perspective view of the acceleration sensor 100;

FIG. 1B is a cross-sectional view of the structure of the acceleration sensor;

FIG. 1C is an equivalent circuit of FIG. 1B;

FIG. 2A is a cross-sectional view of the acceleration sensor of the conventional technique 2;

FIG. 2B is a an equivalent circuit thereof;

FIG. 3A is a cross-sectional view thereof;

FIG. 3B is a cross-sectional view of a piezoelectric vibrator;

FIG. 3C is an equivalent circuit of FIG. 3B;

FIGS. 5A and 5B are drawings showing a connection example of the acceleration sensor in accordance with the first embodiment of the present invention;

FIG. 5A is a cross-sectional view:

FIG. 5B is a top view;

FIG. 6 is an equivalent circuit of a piezoelectric vibrator in accordance with a second embodiment of the present invention;

FIG. 10A shows a first example;

FIG. 10B shows a second example;

FIG. 10C shows a third example; and

DESCRIPTION OF THE PREFERRED EMBODIMENTS

First Embodiment

Figure 3A:
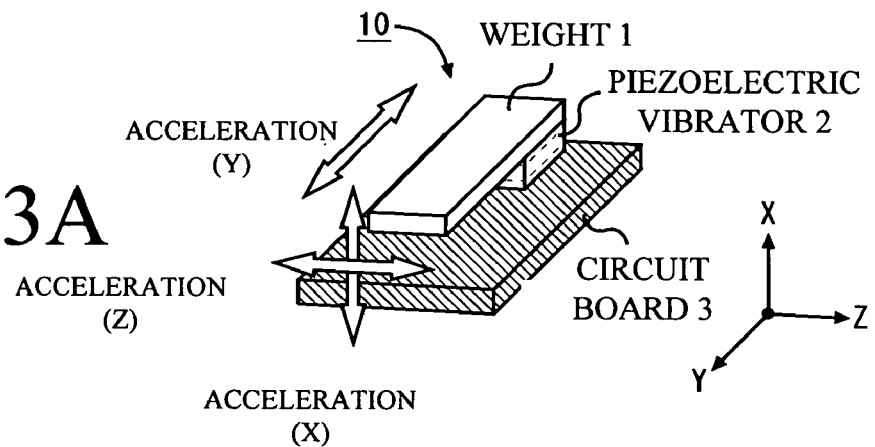
FIGS. 3A, 3B, and 3C show an acceleration sensor in accordance with a first embodiment of the present invention.
Figure 3B:
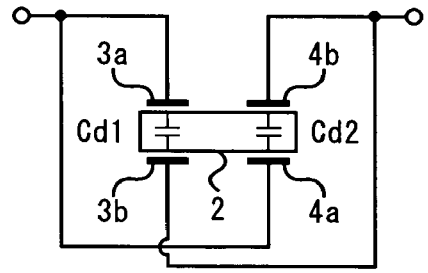

A description will be given of a first embodiment of the present invention, with reference to drawings. FIGS. 3A and 3B show a configuration of an acceleration sensor 10 in accordance with the first embodiment of the present invention. FIG. 3A is a cross-sectional view of the acceleration sensor 10.

Referring to FIG. 3A, the acceleration sensor 10 includes a piezoelectric vibrator 2. The piezoelectric vibrator 2 is provided on a circuit board 3. A weight 1 is provided on the piezoelectric vibrator 2. The weight 1 has a center of gravity on a position deviated from an area above the piezoelectric vibrator 2. In the following description, a front surface denotes the surface on which the weight of the piezoelectric vibrator 2 is provided, and a back surface denotes the surface on which the circuit board 3 is provided.

On both front and back surfaces of the piezoelectric vibrator 2, as shown in FIG. 3B, two pairs of sensing electrodes 3a and 3b, and 4a and 4b, are provided. With the above-mentioned configuration, the sensing electrodes 3a and 3b form a capacitance Cd1, and the sensing electrodes 4a and 4b form a capacitance Cd2.

Figure 3C:
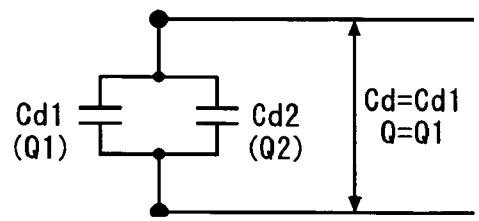

The sensing electrodes 3a and 4a are connected in parallel, and the sensing electrodes 3b and 4b are connected in parallel on the circuit board 3, as shown in FIG. 3B. Thus, the sensing electrodes facing aslant through the thickness of the piezoelectric vibrator 2 are connected in parallel (parallel connection electrode structure) among multiple sensing electrodes 3a, 3b, 4a, and 4b provided on the front and back surfaces of the piezoelectric vibrator 2, which is a single layer board. This makes it possible to use the charge having the same polarity generated by the vibration of the weight 1 on the electrodes, which has a diagonal relationship of the piezoelectric vibrator 2. FIG. 3C shows an equivalent circuit of FIG. 3B.

As described above, the capacitances Cd1 and Cd2 are connected in parallel, and a capacitance Cd of the whole piezoelectric vibrator 2 is expressed in the following (expression 3). As shown in the (expression 3), the capacitance Cd of the present invention is twice as much as that of the piezoelectric vibrator 102 of the conventional technique 1.

$$Cd=Cd1+Cd2=2Cd1 \qquad \text{(expression 3)}$$

(where Cd1=Cd2)

Therefore, in accordance with the first embodiment of the present invention, a generated charge Q is twice as much as the conventional technique 1, as shown in the following (expression 4). This is because a generated charge Q1 is detected on the capacitance Cd1, and a generated charge Q2 is detected on the capacitance Cd2.

$$Q=Q1+Q2=2Q1 \qquad \text{(expression 4)}$$

(where Q1=Q2)

According to the above-mentioned (expression 3) and (expression 4), a voltage sensitivity SV' and a charge sensitivity SQ' of the acceleration sensor 10 are given by following (expression 5) and (expression 6).

$$SV'=Q/Cd=2Q1/2Cd=SV \qquad \text{(expression 5)}$$

$$SQ'=SV'\times Cd=SV\times 2Cd1=2SQ \qquad \text{(expression 6)}$$

Figure 1A:
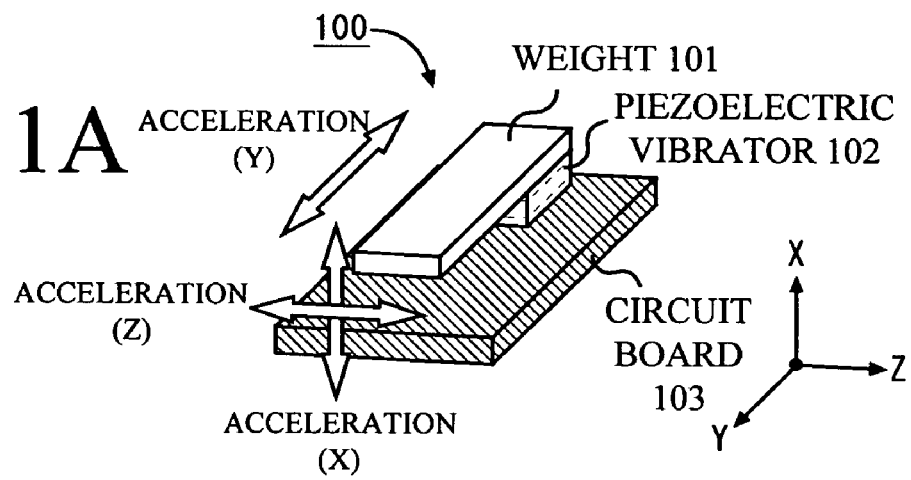
FIGS. 1A, 1B, and 1C are drawings showing a conventional acceleration sensor 100 of a conventional technique 1.
Figure 1B:
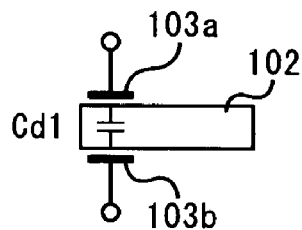
Figure 1C:
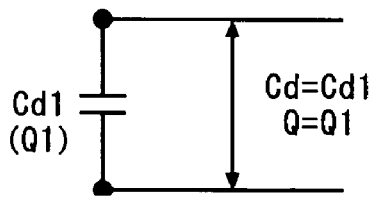
Figure 2A:
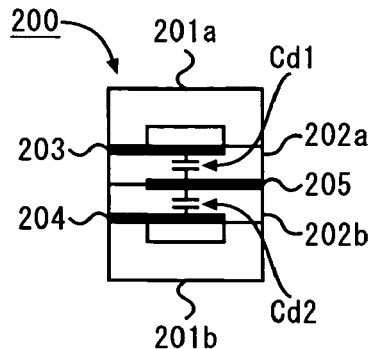
FIGS. 2A and 2B show a configuration of an acceleration sensor of a conventional technique 2.
Figure 2B:
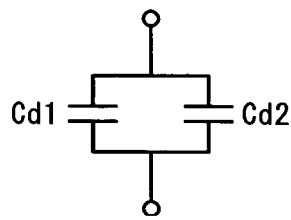
Figure 4:
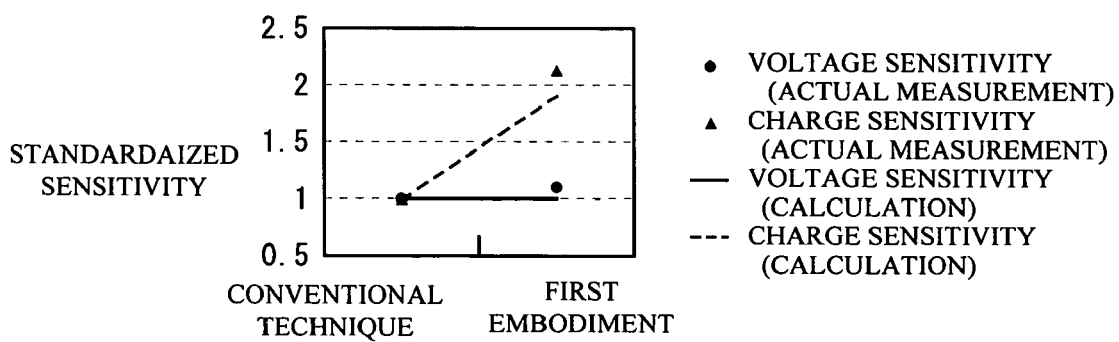
FIG. 4 is a graph showing a comparison between the voltage sensitivity and charge sensitivity of the acceleration sensor of the first embodiment of the present invention and those of the acceleration sensor of the conventional technique 1.

As described, the acceleration sensor 10 in accordance with the first embodiment of the present invention has equal voltage sensitivity, and has the charge sensitivity twice as much as that of the conventional technique 2. FIG. 4 shows a comparison between the voltage sensitivity and charge sensitivity (actual measurement and calculation) of the first embodiment of the present invention and those (actual measurement and calculation) of the conventional technique 1.

FIGS. 5A through 5B show an example of connection between the sensing electrodes 3a, 3b, 4a, and 4b and the circuit board 3. In the example shown in FIG. 5, the sensing electrodes 3b and 4a are provided on the surface (the back surface) directly in contact with the circuit board 3, and are connected to the circuit board 3 by directly bonding with metal bumps 8 and 9 made of gold, aluminum, or the like or conductive resin or anisotropic conductive resin, as shown in FIG. 5A.

In contrast, the sensing electrodes 3a and 4b provided on the front surface of the piezoelectric vibrator 2 are connected to the sensing electrodes 4a and 3b by bonding with metal wires 5 and 6 made of gold, aluminum, or the like, by way of grooves (cut portions 15 and 16) exposed after a sidewall of the weight 1 is removed. The configuration shown in FIG. 5B is thus obtained. In other words, with the above-mentioned connection structure, the sensing electrodes 3a and 4a connected in parallel are connected to the sensing electrodes 3b and 4b connected in parallel. Further, in other words, with the above-mentioned connection structure, the parallel connection is realized between the sensing electrodes diagonally located through the piezoelectric vibrator 2.

With the above-mentioned configuration, in accordance with the first embodiment of the present invention, the acceleration sensor having improved charge sensitivity can be realized with a simple configuration, while maintaining the voltage sensitivity.

Second Embodiment

A description will be given of a second embodiment of the present invention in detail, with reference to drawings. FIG. 6 shows a connection structure of the sensing electrodes 3a, 3b, 4a, and 4b, in accordance with the second embodiment of the present invention.

Referring to FIG. 6, the sensing electrodes connected in parallel (3a and 4a, 3b and 4b) are connected by through holes 11 and 12 provided in a piezoelectric vibrator 2b. In other words, the sensing electrodes 3a and 4a, 4b and 3b, which are arranged aslant through the piezoelectric vibrator 2b, are connected by the through holes 11 and 12 provided aslant in the direction of thickness in the piezoelectric vibrator 2b. The through holes 11 and 12 are crossed sterically not to interconnect inside the piezoelectric vibrator 2b.

The through holes 11 and 12 are directly formed on the piezoelectric vibrator 2b by sandblasting. An interconnection, which is not shown, is formed by filling or sputtering a conductive body such as gold, aluminum, or the like inside the through holes 11 and 12. Thus, two pairs of the sensing electrodes 3a and 4a, and 4b and 3b are respectively connected in parallel.

Other configurations are same as those in the first embodiment of the present invention, and an explanation is omitted here.

Third Embodiment

A description will be given of a third embodiment of the present invention in detail, with reference to drawings. In accordance with the third embodiment of the present invention, another configuration of the sensing electrodes and connection structure, which are different from those in the first embodiment of the present invention, will be described.

Figure 7A:
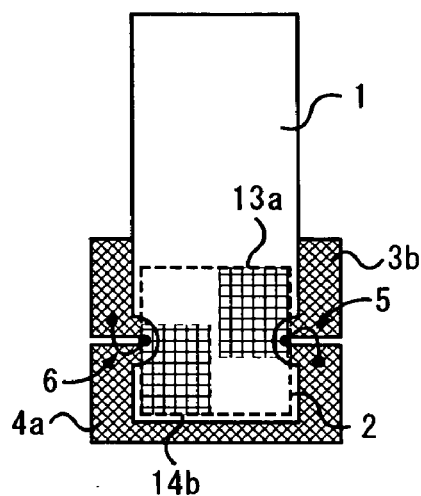
FIG. 7 shows electrode arrangement and connection in accordance with a third embodiment of the present invention.
Figure 7B:
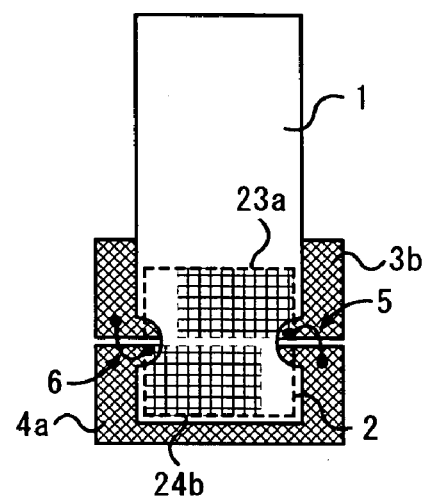

FIGS. 7A and 7B show the configuration of the sensing electrodes and connection structure in accordance with the third embodiment of the present invention. Referring to 7A and 7B, in the present invention, when the two capacitances Cd1 and Cd2 are equal, it is possible to change the shapes of the sensing electrodes (for example, 13a and 14b, or 23a and 24b) of the capacitances Cd1 and Cd2 in any way.

Other configurations are same as those in the first embodiment of the present invention, and an explanation is omitted here.

Fourth Embodiment

Next, a description will be given of a fourth embodiment of the present invention in detail, with reference to drawings. In the above-mentioned first through third embodiments of the present invention, the two pairs of the sensing electrodes 3a and 4a, and 3b and 4b are connected by metal wires 5 and 6. In accordance with the fourth embodiment of the present invention, the metal wires 5 and 6 are replaced by conductive resin.

Figure 8A:
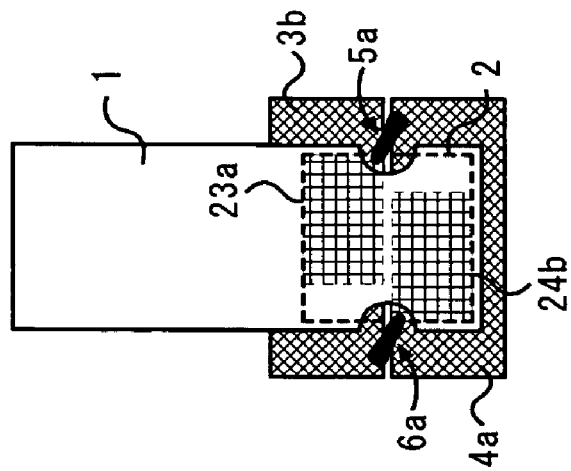
FIG. 8 shows electrode arrangement and connection in accordance with a fourth embodiment of the present invention.
Figure 8B:
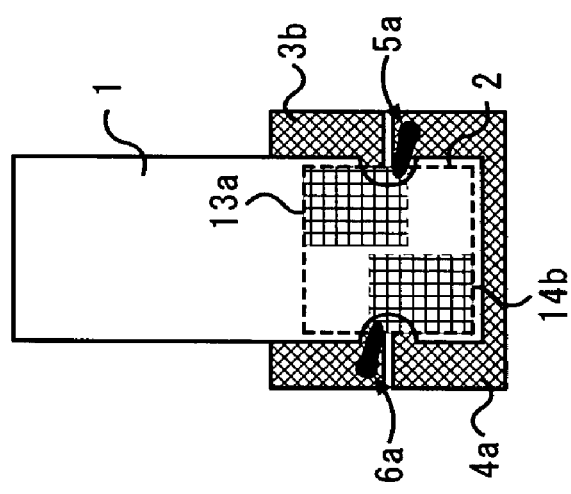
Figure 8C:
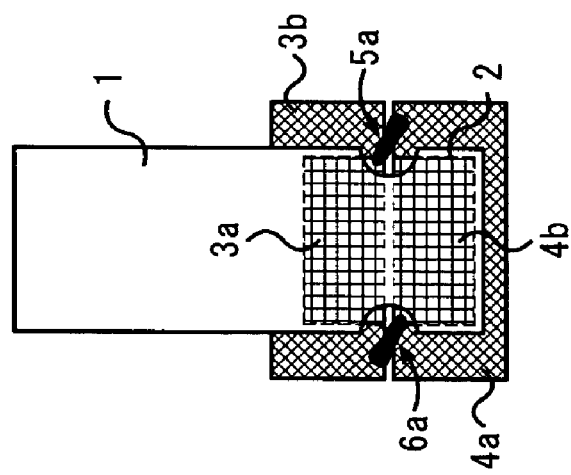

FIGS. 8A, 8B, and 8C are top views illustrating the connection structure of the fourth embodiment of the present invention. FIG. 8A shows a case where the connection shown in FIG. 5B is replaced by conductive resins 5a and 6a. FIG. 8B shows a case where the connection shown in FIG. 7A is replaced by the conductive resins 5a and 6a. FIG. 8C shows a case where the connection shown in FIG. 7B is replaced by the conductive resins 5a and 6a.

Other configurations are same as those in the first embodiment of the present invention, and an explanation is omitted here.

Fifth Embodiment

Next, a description will be given of a fifth embodiment of the present invention in detail, with reference to drawings. In the above-mentioned first embodiment of the present invention, an insulating material such as ceramics, glass, or the like is used for the weight 1. Other materials are employed in the fifth embodiment of the present invention.

Figure 9A:
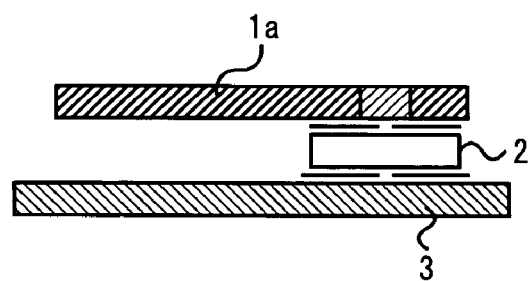
FIG. 9 is a cross-sectional view of a weight in accordance with a fifth embodiment of the present invention.

FIG. 9A is an example of a case where a metal material coated with the insulation material is employed in a weight 1a. It is possible to apply the same connection structure as the embodiments described above to the fifth embodiment of the present invention.

Figure 9B:
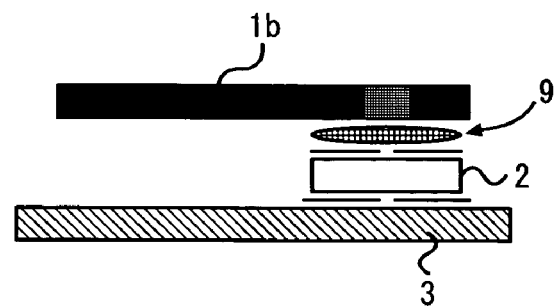

FIG. 9B is an example of a case where a metal material that is not coated with the insulation material is employed in a weight 1b. In the case where the conductive material is employed in the weight 1b, an insulating layer (insulation layer) 9 is provided between the weight 1b and the piezoelectric vibrator 2. It is thus possible to avoid an electric connection between the sensing electrodes 3a and 4b provided on the front surface of the piezoelectric vibrator 2 and the weight 1b. The insulation layer 9 is formed with the use of epoxy resin or the like having an inorganic filler with a diameter of equal to or more than a surface roughness of the weight 1b and the piezoelectric vibrator 2.

Other configurations are same as those in the first embodiment of the present invention, and an explanation is omitted here.

Sixth Embodiment

Next, a description will be given of a sixth embodiment of the present invention in detail, with reference to drawings. In the above-mentioned first embodiment of the present invention, the sensing electrodes connected in parallel 3a and 4a, and 3b and 4b are connected by way of the cut portions 15 and 16, which are formed by removing the sidewall of the weight 1. In contrast, in accordance with the sixth embodiment of the present invention, the through holes are formed inside the weight 1 to obtain the same connection structure as the embodiments mentioned above.

Figure 10A:
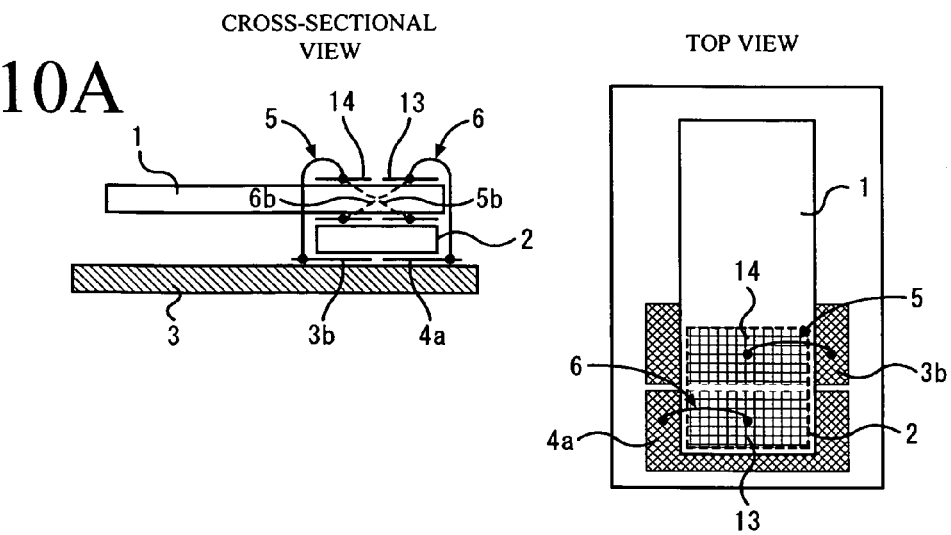
FIGS. 10A, 10B, and 10C show electrode arrangement and connection in accordance with a sixth embodiment of the present invention.

FIG. 10A is a cross-sectional view and a top view of a first example of the weight 1 and the connection structure in accordance with the sixth embodiment of the present invention. As is obvious from FIG. 10A, in the first example, through holes 5b and 6b are formed inside the weight 1 to connect electrodes 13 and 14 provided on the weight 1 and the piezoelectric vibrator 2. The through holes 5b and 6b are crossed sterically to connect the electrodes located diagonally. The through holes 5b and 6b do not interconnect inside the weight 1. The connection between the sensing electrodes 3a and 4a and the sensing electrodes 3b and 4b are achieved by connecting the electrodes 13 and 4a, and 14 and 3b.

Figure 10B:
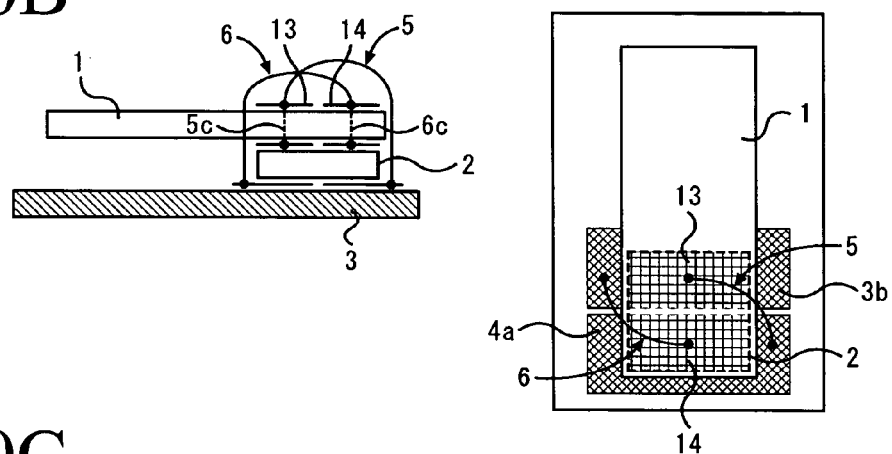

FIG. 10B is a cross-sectional view and a top view of a second example of the weight 1 and the connection structure in accordance with the sixth embodiment of the present invention. As is obvious from FIG. 10B, in the second example, through holes 5c and 6c are formed inside the weight 1 to connect the electrodes 13 and 14 provided on the weight 1 and the piezoelectric vibrator 2. The through holes 5c and 6c are formed in a direction perpendicular to top and bottom faces of the weight 1 to connect the electrodes located on the top and bottom faces through the weight 1. Interconnections between the electrodes 13 and 14 provided on the top face of the weight 1 and the sensing electrodes 3b and 4a are crossed to be connected in parallel. The connection between the sensing electrodes 3a and 4a, and 3b and 4b are achieved by connecting the electrodes 13 and 4a, and the electrodes 14 and 3b.

Figure 10C:
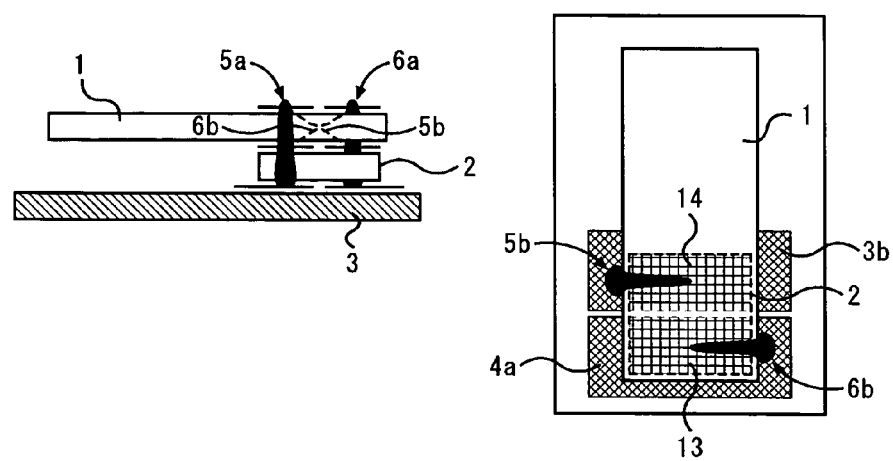
Figure 11:
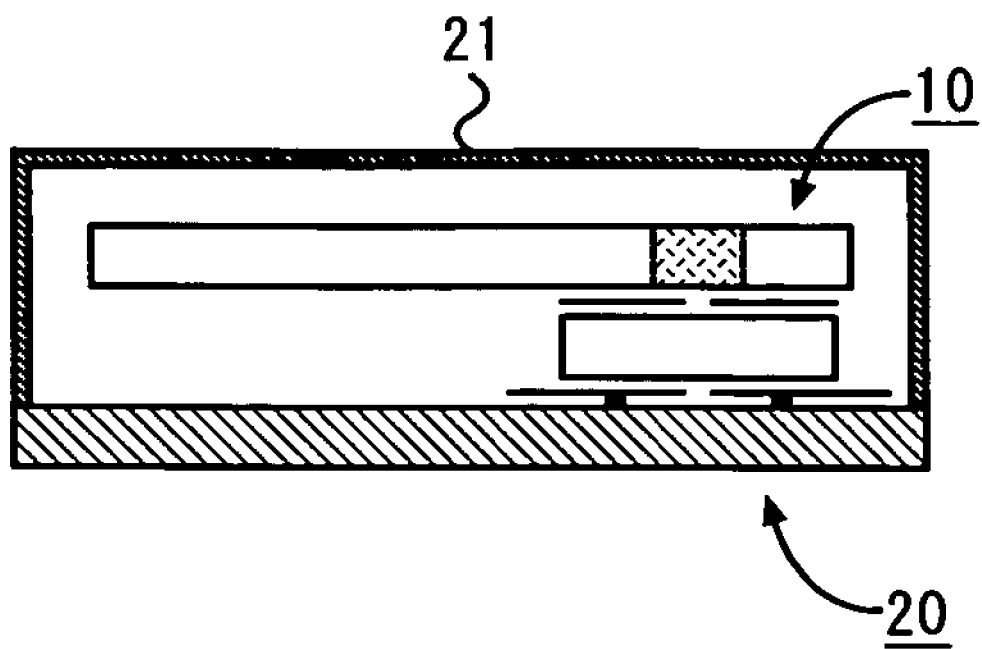
FIG. 11 is a cross-sectional view of an acceleration sensor package 20 into which the acceleration sensor in accordance with the present invention is packaged.

In the connection structure shown in FIG. 10A, the metal wires 5 and 6 may be replaced by conductive resins 5b and 6b, for example, as shown in FIG. 10C.

Other configurations are same as those in the first embodiment of the present invention, and an explanation is omitted here.

Seventh Embodiment

The acceleration sensor 10 in accordance with the embodiments of the present invention may be packaged with a lid 21 or the like to provide as an acceleration sensor package 20.

Other Embodiments

The present invention is not limited to the above-mentioned embodiments, and other embodiments, variations and modifications may be made without departing from the scope of the present invention.

As described above, in accordance with the present invention, it is possible to obtain the acceleration sensor that can enhance the charge sensitivity while maintaining the high voltage sensitivity, with a simple structure of the single-layered piezoelectric vibrator.

What is claimed is:

1. An acceleration sensor comprising:
   a vibrator that generates an electric charge according to a stress; and
   a weight provided on the vibrator,
   wherein the vibrator has multiple pairs of sensing electrodes on front and back surfaces;
   capacitances formed with the sensing electrodes are connected in parallel; and
   the sensing electrodes located diagionally among the multiple pairs of sensing electrodes are connected through the vibrator, and the capacitances are connected in parallel.

2. The acceleration sensor as claimed in claim 1, wherein the vibrator is a single-layer substrate of a piezoelectric material.

3. The acceleration sensor as claimed in claim 1, wherein the weight has a center of gravity outside the vibrator.

4. The acceleration sensor as claimed in claim 1, wherein the vibrator has through holes to connect the sensing electrodes located diagonally through the vibrator.

5. The acceleration sensor as claimed in claim 1, wherein the weight has grooves to expose the sensing electrodes provided on the front surface of the vibrator.

6. The acceleration sensor as claimed in claim 5, wherein the sensing electrodes located diagonally through the vibrator are connected by metal wires or a conductive resin.

7. The acceleration sensor as claimed in claim 1, wherein the weight has electrodes provided on the front surface thereof and through holes to connect the electrodes and the sensing electrodes of the vibrator, wherein the sensing electrodes located diagonally through the vibrator are connected through the electrodes and the through holes.

8. The acceleration sensor as claimed in claim 7, wherein the sensing electrodes provided on the back surface of the vibrator and the electrodes provided on the front surface of the weight are connected by metal wires or a conductive resin.

9. The acceleration sensor as claimed in claim 1, wherein the weight is made of an insulation material.

10. The acceleration sensor as claimed in claim 1, wherein the weight is made of a metal of insulation coating.

11. The acceleration sensor as claimed in claim 1, wherein the weight is made of metal, and an insulation layer is arranged between the weight and the sensing electrodes provided on the front surface of the vibrator.

12. The acceleration sensor as claimed in claim 1, further comprising a circuit board provided under the vibrator, wherein the sensing electrodes provided on the back surface of the vibrator and the circuit board are bonded.

13. An acceleration sensor package comprising an acceleration sensor including a vibrator that generates an electric charge according to a stress and a weight provided on the vibrator,
   wherein:
   the vibrator has multiple pairs of sensing electrodes on front and back surfaces;
   capacitances formed with the sensing electrodes are connected in parallel; and
   the sensing electrodes located diagonally among the multiple pairs of sensing electrodes are connected through the vibrator, and the capacitances are connected in parallel.

14. The acceleration sensor as claimed in claim 1, wherein the multiple pairs of sensing elements are arranged side by side in a longitudinal direction of the vibrator.

15. The acceleration sensor as claimed in claim 1, wherein the multiple pairs of sensing elements are arranged side by side in a direction perpendicular to a longitudinal direction of the vibrator, and partially face each other in said direction.

* * * * *